United States Patent
Korneluk et al.

(10) Patent No.: US 12,335,856 B2
(45) Date of Patent: *Jun. 17, 2025

(54) METHOD AND APPARATUS FOR MULTI-SIM SELECTION

(71) Applicant: Malikie Innovations Limited, Dublin (IE)

(72) Inventors: Jose Eduardo Korneluk, Lake Worth, FL (US); Sandeep Chennakeshu, Austin, TX (US); Siddharth Saxena, Sunrise, FL (US); Sergio Javier Berriz, Miami, FL (US)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,578

(22) Filed: Nov. 8, 2023

(65) Prior Publication Data
US 2024/0187979 A1    Jun. 6, 2024

Related U.S. Application Data

(63) Continuation of application No. 17/584,559, filed on Jan. 26, 2022, now Pat. No. 11,864,101, which is a
(Continued)

(51) Int. Cl.
*H04W 48/16*    (2009.01)
*G01S 19/34*    (2010.01)
(Continued)

(52) U.S. Cl.
CPC ............ *H04W 48/18* (2013.01); *G01S 19/34* (2013.01); *H04B 1/3816* (2013.01);
(Continued)

(58) Field of Classification Search
CPC ..... H04W 88/06; H04W 68/02; H04W 84/12; H04W 76/025; H04W 8/183;
(Continued)

(56) References Cited

U.S. PATENT DOCUMENTS 8,170,614 B2    5/2012  Kim
8,405,741 B2    3/2013  Nakahara et al.
(Continued)

FOREIGN PATENT DOCUMENTS

CN    102576419 A    7/2012
CN    103167476 A    6/2013
(Continued)

OTHER PUBLICATIONS

Advisory Action; U.S. Appl. No. 14/987,897, filed Jul. 26, 2017.
(Continued)

*Primary Examiner* — Phuoc H Doan
(74) *Attorney, Agent, or Firm* — Botos Churchill IP Law LLP

(57) ABSTRACT

A method for steering of roaming (SOR) in wireless communication networks includes sending by a mobile equipment (ME) a registration message to a visited public land mobile network (VPLMN). The ME receives a first message from a home public land mobile network (HPLMN) through the VPLMN. The ME determines that the first message has failed a security check. In response to determining that the first message has failed the security check, the ME sends a second message to the VPLMN, the second message including an indication that the first message has failed the security check.

20 Claims, 9 Drawing Sheets

Related U.S. Application Data continuation of application No. 16/931,746, filed on Jul. 17, 2020, now Pat. No. 11,272,441, which is a continuation of application No. 16/268,701, filed on Feb. 6, 2019, now Pat. No. 10,757,644, which is a continuation of application No. 15/875,240, filed on Jan. 19, 2018, now Pat. No. 10,231,178, which is a continuation of application No. 14/987,897, filed on Jan. 5, 2016, now Pat. No. 9,877,275.

(51) Int. Cl.

| | | |
|---|---|---|
| *H04B 1/3816* | (2015.01) | |
| *H04B 1/3827* | (2015.01) | |
| *H04W 48/04* | (2009.01) | |
| *H04W 48/18* | (2009.01) | |
| *H04W 52/02* | (2009.01) | |
| *H04W 64/00* | (2009.01) | |
| *H04W 84/04* | (2009.01) | |
| *H04W 88/06* | (2009.01) | |

(52) U.S. Cl.
CPC .......... *H04B 1/3827* (2013.01); *H04W 48/04* (2013.01); *H04W 48/16* (2013.01); *H04W 52/0209* (2013.01); *H04W 64/00* (2013.01); *H04W 84/042* (2013.01); *H04W 88/06* (2013.01); *Y02D 30/70* (2020.08)

(58) Field of Classification Search
CPC ........... H04W 52/0209; H04W 84/042; H04W 72/0453; H04W 24/02; H04W 88/08; G06K 7/10366; H04B 1/3816
See application file for complete search history.

(56) References Cited

U.S. PATENT DOCUMENTS

| | | | |
|---|---|---|---|
| 2005/0280576 A1 | 12/2005 | Shemesh et al. | |
| 2010/0279698 A1 | 11/2010 | Wong | |
| 2011/0105081 A1 | 5/2011 | Park et al. | |
| 2011/0269503 A1 | 11/2011 | Park et al. | |
| 2012/0135715 A1 | 5/2012 | Kang et al. | |
| 2012/0142348 A1 | 6/2012 | Park et al. | |
| 2012/0178500 A1* | 7/2012 | Hwang | H04W 8/183 455/558 |
| 2012/0225691 A1 | 9/2012 | Desjeux et al. | |
| 2013/0072256 A1 | 3/2013 | Su | |
| 2013/0281085 A1 | 10/2013 | Sen et al. | |
| 2014/0274006 A1 | 9/2014 | Mutya et al. | |
| 2015/0017962 A1 | 1/2015 | Howard et al. | |
| 2015/0373530 A1 | 12/2015 | Stein | |
| 2016/0262200 A1 | 9/2016 | Su | |
| 2016/0323933 A1 | 11/2016 | Song et al. | |

FOREIGN PATENT DOCUMENTS

| | | |
|---|---|---|
| CN | 103942672 A | 7/2014 |
| CN | 204557230 U | 8/2015 |
| CN | 204650755 U | 9/2015 |
| EP | 2518977 A1 | 10/2012 |
| EP | 2618599 A1 | 7/2013 |
| KR | 100811521 B1 | 3/2008 |
| WO | 2006031382 A2 | 3/2006 |
| WO | 2010140781 A2 | 12/2010 |
| WO | 2013007869 A1 | 1/2013 |
| WO | 2015177602 A1 | 11/2015 |

OTHER PUBLICATIONS

Chinese Office Action; 201710005995.4 May 7, 2020.
Chinese Office Action; 201710005995.4 Nov. 22, 2019.
Extended European Search Report; EP 16205888.7; May 22, 2017.
Extended European search report; EP19183454.8 Aug. 13, 2019.
Final Office Action; U.S. Appl. No. 14/987,897; Jun. 1, 2017.
http://www.lelong.eom.my/car-gps-tracker-real-time-gps-tracking-portable-dual-sim-gsm-geo-anuarict-111548042-2013-07-Sale-P.htm 2013.
Notice of Allowance; U.S. Appl. No. 16/268,701, filed Apr. 17, 2020.
Notice of allowance; U.S. Appl. No. 16/931,746, filed Oct. 27, 2021.
Office Action issued in corresponding Canadian Patent Application No. 2952499, mailed Oct. 6, 2023, 12 pages.
Office Action; CA Application No. 2952499 Jan. 26, 2023.
Office Action; U.S. Appl. No. 16/268,701, filed Nov. 21, 2019.
Office Action; U.S. Appl. No. 16/268,701, filed Jul. 25, 2019.
Office Action; U.S. Appl. No. 16/931,746, filed Jun. 22, 2021.
Office Action; U.S. Appl. No. 14/987,897; Nov. 18, 2016.
Office Action; U.S. Appl. No. 15/875,240, filed Jun. 15, 2018.
The First Office Action for Chinese Patent Application No. 202011561203.X, Jul. 22, 2023, 12 Pages.
First Office Action issued in Chinese application No. 2020115646233, dated Jul. 14, 2023., Jul. 14, 2023.

* cited by examiner

METHOD AND APPARATUS FOR MULTI-SIM SELECTION

CROSS REFERENCE TO RELATED APPLICATIONS

The present application is a continuation of U.S. patent application Ser. No. 17/584,559, filed Jan. 26, 2022, which is a continuation of U.S. patent application Ser. No. 16/931, 746, filed Jul. 17, 2020, (now U.S. Pat. No. 11,272,441, issued Mar. 8, 2022), which is a continuation of U.S. patent application Ser. No. 16/268,701, filed Feb. 6, 2019, (now U.S. Pat. No. 10,757,644, issued Aug. 25, 2020), which is a continuation of U.S. patent application Ser. No. 15/875,240, filed Jan. 19, 2018, (now U.S. Pat. No. 10,231,178, issued Mar. 12, 2019) which is a continuation of U.S. patent application Ser. No. 14/987,897, filed Jan. 5, 2016, (now U.S. Pat. No. 9,877,275, issued Jan. 23, 2018), the entire content of these documents being incorporated herein by reference.

FIELD OF THE INVENTION

The present disclosure relates generally to mobile transceivers, and more specifically, to a mobile transceiver having multiple Subscriber Identity Module (SIM) cards and a method of selection.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. Examples of types of GNSS tracking devices include: a data logger, a data pusher and a data puller. A data logger may store the measured location data in internal memory for subsequent download and analysis. A data pusher (also known as a beacon) may send location data stored in internal memory to a server or other device in accordance with predefined parameters. A data puller (also known as a transponder) may store location data in internal memory and provides the location data in response to queries from a server or other device. GNSS tracking devices may have limited power and/or limited processing resources. Accordingly, methods of efficiently operating and deploying GNSS tracking devices may be desirable.

DETAILED DESCRIPTION

Figure 1:
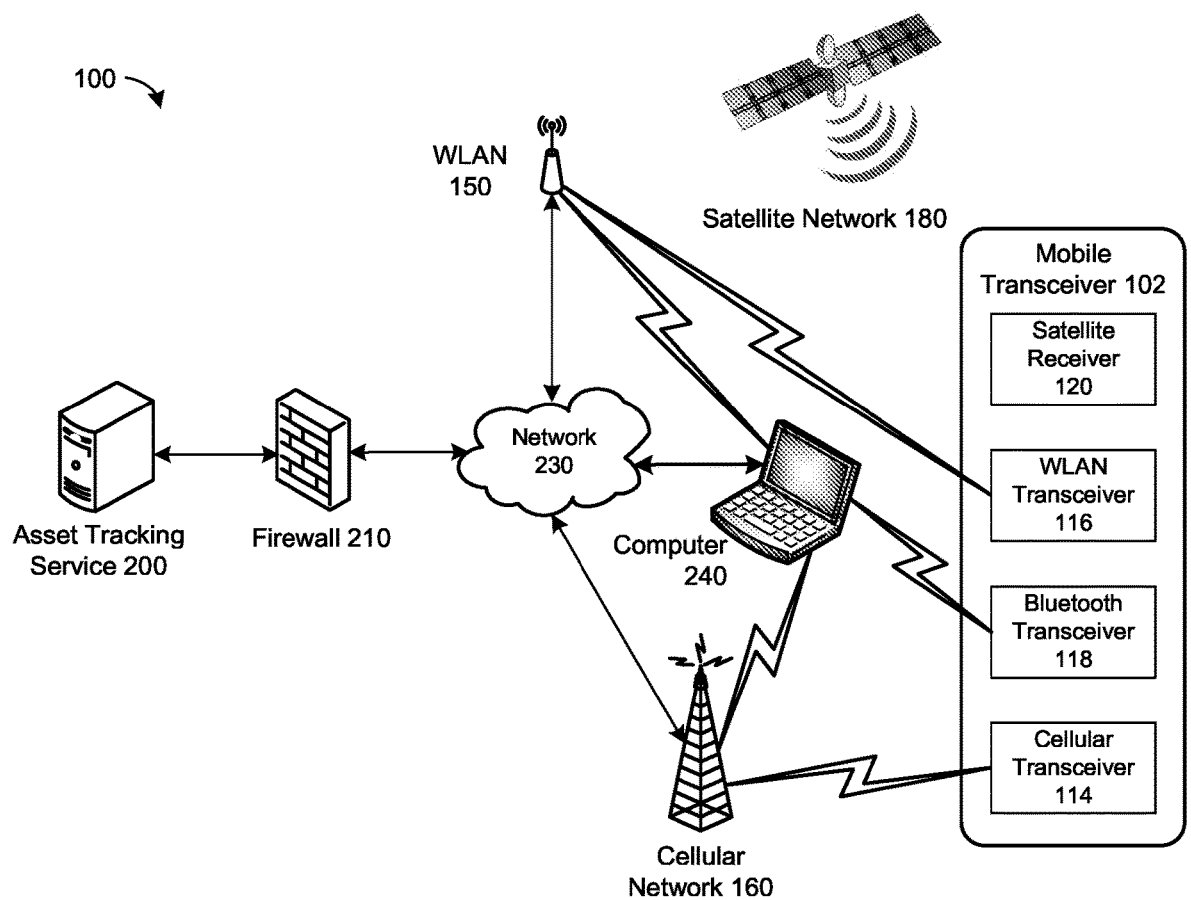
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that may allow global and long-range tracking applications in which an asset in global and long-range transit can be tracked even though it crosses wireless carrier and network coverage boundaries while in transit. In global and long-range tracking applications the mobile transceiver and the asset being tracked may cross wireless carrier and network coverage boundaries while in transit. For example, it is not uncommon for a shipping container to originate in mainland China and travel around South Africa with a final destination in North America.

In accordance with an example embodiment of one aspect of the present disclosure, there is provided a method of operating a mobile transceiver, comprising: using a cellular transceiver in association with a first subscriber identity module (SIM) card in a plurality of SIM cards to access a first wireless network; and using the cellular transceiver in association with a second SIM card in the plurality of SIM cards to access a second wireless network in response to a failure to access the first wireless network with the first SIM card.

In some examples, the first wireless network and the second wireless network are the same wireless network.

In some examples, the first wireless network and the second wireless network are different wireless networks.

In some examples, using the cellular transceiver in association with the first SIM card is performed in response to waking up the mobile transceiver from a low power mode.

In some examples, the method further comprises: before using the cellular transceiver in association with the first SIM card, selecting the first SIM card in the plurality of SIM cards.

In some examples, selecting the first SIM card in the plurality of SIM cards is performed in response to waking up the mobile transceiver from a low power mode.

In some examples, the method further comprises: using the cellular transceiver in association with a further SIM card in the plurality of SIM cards to access a further wireless network in response to a failure to access the second wireless network with the second SIM card.

In some examples, the further wireless network, first wireless network and the second wireless network are the same wireless network.

In some examples, the further wireless network, first wireless network and the second wireless network are different wireless networks.

In some examples, the first SIM card is determined in accordance with a location of the mobile transceiver.

In some examples, the first SIM card is determined in accordance with a country in which the mobile transceiver is located.

In some examples, the mobile transceiver is waken up from the low power mode in response to a wakeup event, wherein the first SIM card is determined in accordance with the wakeup event.

In some examples, selecting the first SIM card from the plurality of SIM cards comprises: determining from a memory of the mobile transceiver a pre-selected SIM card from the plurality of SIM cards; and selecting the pre-selected SIM card from the plurality of SIM cards.

In some examples, the first SIM card is pre-selected in accordance with the wakeup event.

In some examples, the pre-selected SIM card is a last used SIM card.

In some examples, the wakeup event is a time-based alarm.

In some examples, the method further comprises: searching, via the cellular transceiver, for available wireless services associated with the first SIM card.

In some examples, the method comprises: in response to a failure to access the first wireless network with the first SIM card: resetting the cellular transceiver using the second SIM card; and searching, via the cellular transceiver, for available wireless services associated with the second SIM card.

In some examples, selecting the first SIM card from the plurality of SIM cards comprises: determining a location of the mobile transceiver using a satellite receiver; and selecting the SIM card from the plurality of SIM cards in accordance with characteristics of the first SIM card and the determined location of the mobile transceiver.

In some examples, the wakeup event is a sensor-based alarm.

In some examples, the method further comprises: in response to a determination that each SIM in the plurality of SIM cards has been attempted and no wireless service is available, initiating a low power mode for the mobile transceiver.

In some examples, the plurality of SIM cards comprises virtual SIM cards.

In accordance with an example embodiment of another aspect of the present disclosure, there is provided a method of operating a mobile transceiver, comprising: activating a cellular transceiver using a first subscriber identity module (SIM) card in a plurality of SIM cards; switching from the first SIM card to a second SIM card in the plurality of SIM cards in response to a determination that a wireless service for the first SIM card is not available.

In some examples, activating the cellular transceiver using the first SIM card is performed in response to waking up the mobile transceiver from a low power mode.

In some examples, the method further comprises: before activating the cellular transceiver using the first SIM card, selecting the first SIM card in the plurality of SIM cards.

In some examples, selecting the first SIM card in the plurality of SIM cards is performed in response to waking up the mobile transceiver from a low power mode.

In some examples, the method further comprises: searching, via the cellular transceiver, for available wireless services associated with the first SIM card.

In some examples, the method further comprises: resetting the cellular transceiver using the second SIM card; searching, via the cellular transceiver, for available wireless services associated with the second SIM card; and switching from the second SIM card to a further SIM card in the plurality of SIM cards in response to a determination that a wireless service for the second SIM card is not available.

In some examples, the first SIM card is determined in accordance with a location of the mobile transceiver.

In some examples, the first SIM card is determined in accordance with a country in which the mobile transceiver is located.

In some examples, the mobile transceiver is waken up from the low power mode in response to a wakeup event, wherein the first SIM card is determined in accordance with the wakeup event.

In some examples, selecting the first SIM card from the plurality of SIM cards comprises: determining from a memory of the mobile transceiver a pre-selected SIM card from the plurality of SIM cards; and selecting the pre-selected SIM card from the plurality of SIM cards.

In some examples, the first SIM card is pre-selected in accordance with the wakeup event.

In some examples, the pre-selected SIM card is a last used SIM card.

In some examples, the wakeup event is a time-based alarm.

In some examples, selecting the first SIM card from the plurality of SIM cards comprises: determining a location of the mobile transceiver using a satellite receiver; and selecting the SIM card from the plurality of SIM cards in accordance with characteristics of the first SIM card and the determined location of the mobile transceiver.

In some examples, the wakeup event is a sensor-based alarm.

In some examples, the method further comprises: in response to a determination that each SIM in the plurality of SIM cards has been attempted and no wireless service is available, initiating a low power mode for the mobile transceiver.

In some examples, the plurality of SIM cards comprises virtual SIM cards.

In accordance with an example embodiment of a further aspect of the present disclosure, there is provided a method of operating a mobile transceiver, comprising: waking up the mobile transceiver from a low power mode in response to a wakeup event; determining whether a SIM card has been pre-selected for a location of the mobile transceiver or the wakeup event; when a SIM card has been pre-selected, selecting the pre-selected SIM card as a first subscriber identity module (SIM) card, activating a cellular transceiver using the first SIM card, and searching, via the cellular transceiver, for available wireless services associated with the first SIM card; and when a wireless service is available, sending at least a portion of a data log to an asset tracking service using the wireless service.

In accordance with an example embodiment of a further aspect of the present disclosure, there is provided a method of operating a mobile transceiver, comprising: activating a cellular transceiver from a low power mode in response to a wakeup event, wherein the cellular transceiver is activated using a first SIM card; searching, via the cellular transceiver, for available wireless services associated with the first SIM card; and switching from the first SIM card to a different SIM card in a plurality of SIM cards when a wireless service is not available.

In accordance with an example embodiment of a further aspect of the present disclosure, there is provided a method of operating a mobile transceiver, comprising: activating a cellular transceiver from a low power mode in response to a wakeup event, wherein the cellular transceiver is activated using a first SIM card; searching, via the cellular transceiver, for available wireless services associated with the first SIM card; and when a wireless service is available, determining whether a different SIM card is preferred to the first SIM card in accordance with a mobile country code (MCC) of the available wireless services and a mapping between the plurality of SIM cards and location; and switching from the first SIM card to the other SIM card when a different SIM card is preferred to the first SIM card.

In accordance with an embodiment of yet a further aspect of the present disclosure, there is provided a method of operating a mobile transceiver, comprising: activating the mobile transceiver from a low power mode in response to a wakeup event; determining whether the wakeup event corresponds to a waypoint in a travel itinerary; when the wakeup event corresponds to a waypoint in a travel itinerary, selecting a SIM card from a plurality of SIM cards as a first SIM card in accordance with the waypoint and a pre-defined SIM card selection associated with the waypoint; and searching, via a cellular transceiver, for available wireless services associated with the first SIM card.

In accordance with an embodiment of yet a further aspect of the present disclosure, there is provided a method of operating a mobile transceiver, comprising: waking up the mobile transceiver from a low power mode; selecting a first subscriber identity module (SIM) card from a plurality of SIM cards; activating a cellular transceiver using the first SIM card; searching, via the cellular transceiver, for available wireless services associated with the first SIM card; and switching from the first SIM card to a second SIM card in the plurality of SIM cards when a wireless service for the first SIM card is not available.

In accordance with example embodiments of yet further aspects of the present disclosure, there is provided a mobile transceiver, comprising: a processor; a memory coupled to the processor; a wireless transceiver coupled to the processor; a satellite receiver coupled to the processor; a plurality of SIM cards coupled to the processor, wherein the SIM cards may be physical or virtual; wherein the mobile transceiver is configured to perform the methods described herein.

In accordance with example embodiments of yet further aspects of the present disclosure, there is provided a non-transitory machine readable medium having tangibly stored thereon executable instructions that, when executed by a processor of a mobile transceiver, the mobile transceiver comprising a memory, a wireless transceiver and a satellite receiver each coupled to the processor, wherein the executable instructions cause the mobile transceiver to perform the methods described herein.

Figure 2:
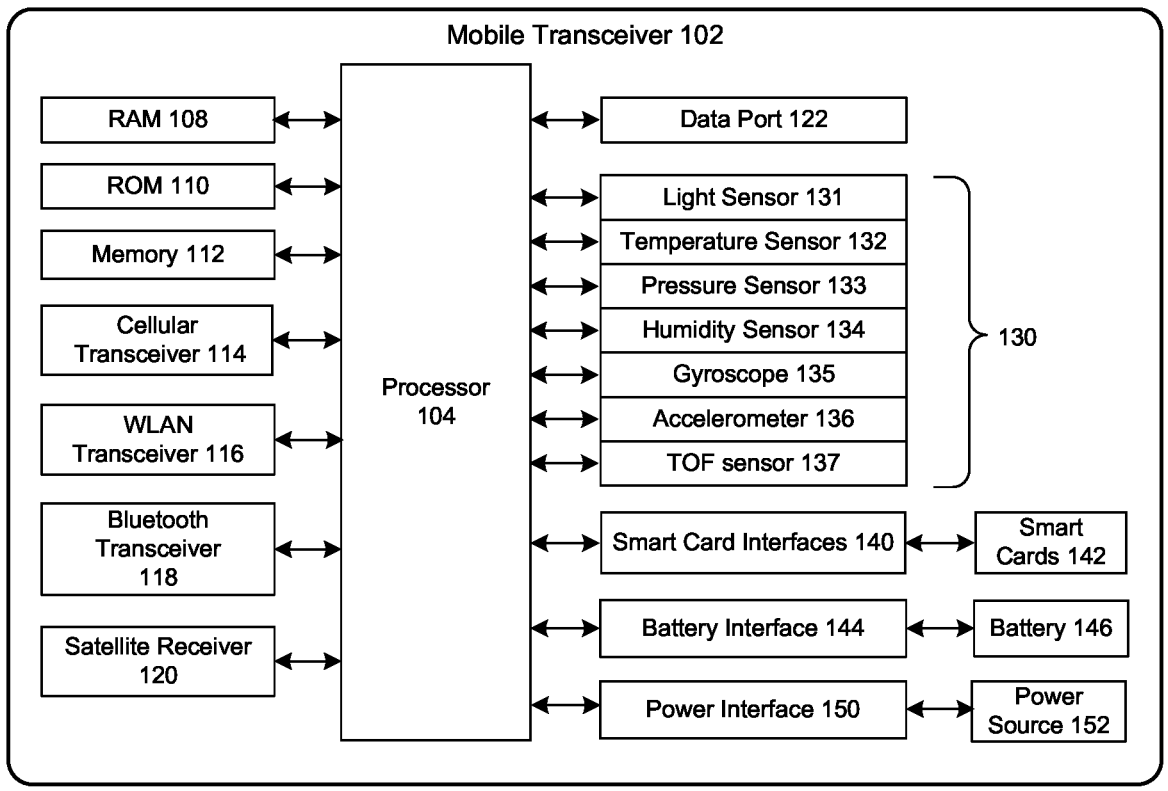
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), and a plurality of environmental sensors 130 for sensing the environment of the mobile transceiver 102. The sensors 130 may comprise a light sensor 131, temperature sensor 132, pressure sensor 133, humidity sensor 134, gyroscope 135, accelerometer 136, one or more time-of-flight (ToF) sensors 137 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 can use signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed.

The cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. Multiple dedicated transceivers could be provided to support different wireless services, such as 4G LTE, 3G and 2G wireless services in other embodiments.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computer 240. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. The mobile transceiver 102 includes a plurality of smart card interfaces 140, each smart card interface 140 receiving a smart card 142 for storing and reading data, such as subscriber identity data, by the processor 104. The smart cards 142 may be Subscriber Identity Module (SIM) cards for use in a GSM network or other type of smart card for use in the relevant wireless network type which provides wireless network access. The smart cards 142 may be Universal Integrated Circuit Cards (UICCs) each containing at least a SIM and a Universal Subscriber Identity Module (USIM) application. UICC is the smart card technology used in most contemporary GSM and UMTS networks. While SIM cards for a GSM network has been described as an example, the term smart card is intended to encompass all types of smart cards and other similar technology for providing a USIM, Removable User Identity Module (R-UIM) or CDMA Subscriber Identity Module (CSIM) or other similar technology used in UMTS and CDMA networks. The SIMs may be physical or virtual SIMs. A virtual SIM/SIM card is a data object stored in memory, such as the memory 112, which includes the subscriber identity data normally stored on a physical SIM card, emulating a physical SIM card.

The SIM cards include subscriber identity data (also referred to as SIM data) includes information necessary to obtain access to a wireless voice and/or data network provided, for example, by a wireless network service provider, depending on the embodiment. The subscriber identity data may include network operator bundle information and/or user data information. Examples of network operator bundle information and/or user data information may include subscriber identification information, network selection parameters, network operator data and application data for accessing various data services, etc. In one embodiment, the subscriber identity data comprises subscriber identification information, network selection parameters, and network operator data (sometimes referred to as "network credentials"). In other embodiments, the subscriber identity may include more or less information. For example, in some embodiments, the subscriber identity data may further comprise application data.

Examples of subscriber identification information may include, without limitation, International Mobile Subscriber Identity (IMSI), Integrated Circuit Card ID (ICCID), Temporary Mobile Subscriber Identity (TMSI), Packet TMSI (P-TMSI), and Mobile Subscriber Integrated Services Digital Network Number (MSISDN). Example network selection parameters include, without limitation, Public Land Mobile Network Selector (PLMNSel), Forbidden PLMN (FPLMN), and Home PLMN (HPLMN). Examples of network operator data include, without limitation, Operator controlled PLMN (OPLMN) list SPN (Service Provider Name), PLMN Network Name (PNN) for name display, Emergency Control Center (ECC) for emergency calls, and other call categories, etc. Examples of application data include, without limitation, the SIM Application Toolkit (STK) (e.g., Roaming Broker, Enhanced Network Selection (ENS), International Mobile Equipment Identity (IMEI) change applications, etc.)

In some embodiments, the subscriber identity data may further comprise authentication information, such as keys, and encryption algorithms, etc. For example, authentication information may comprise an authentication key (Ki) and the encryption algorithms described in 3GPP TS 35.205 V9.0.0 published Dec. 31, 2009 and entitled "Specification of the MILENAGE Algorithm Set: An example algorithm set for the 3GPP authentication and key generation functions f1, f1*, f2, f3, f4, f5 and f5*", the disclosure of which is hereby incorporated by reference in its entirety.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service. It will be appreciated that the mobile transceiver 102 is intended for uninterrupted operation even though one or more components, such as the cellular transceiver 114, satellite receiver 120 and/or sensors 130 may be put into a low power mode periodically to conserve battery life. An initialization date or similar date when the mobile transceiver 102 was first powered on, e.g. when the battery 146 is first installed, may be used to determine the date and time of the first power up. Due to the desire for uninterrupted operation, it is contemplated that the mobile transceiver 102 may lack a power button (on/off button) in some embodiments.

The mobile transceiver 102 may also include a power interface, such as a power port, for connecting to an external power source 152 such as an alternating current (AC) power adapter. The mobile transceiver 102 can use the external power source 152 rather than the battery 146. If the battery 146 is rechargeable, the external power source 152 may be used to recharge the battery 146.

Referring again to FIG. 1, an example communication system 100 in which a mobile transceiver 102 of the present disclosure can operate will be described. The mobile transceiver 102 typically uses the cellular network 160 to access an asset tracking service (e.g., a server or fleet management system) 200. The asset tracking server 200 may be implemented as one or more server modules and is typically located behind a firewall 210. The asset tracking server 200 provides administrative control and management capabilities over a plurality of managed mobile transceivers 102. The asset tracking service 200 may be embodied as a variety of configurations, in hardware or software, including a server-based system, an Application Programming Interface (API) and/or endpoint that provides access and abstraction of the functionality of asset tracking server 200 such that no hardware or configuration information is necessary to access the functionality other than the API location and functional definitions.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location in response to an alarm. An alarm is a configurable wakeup event which causes the mobile transceiver 102, or a subsystem of the mobile transceiver 102 such as the satellite receiver 120 or one or more sensors 130, to wake up from a low power mode such as a sleep mode and perform configured actions (e.g., performs measurements of location and sensors) which are then logged and/or reported to the asset tracking service 200. The alarm may be a time-based alarm which the subsystem wakes up at regular intervals in accordance with a predefined schedule among other possibilities. The frequency or schedule at which the location is determined may be fixed or configurable. The mobile transceiver 102 stores the determined location, typically in terms of Latitude and Longitude, and a time at which the location was determined in a data log stored in the memory 112 of the mobile transceiver 102. Thus, the data log provides an asset tracking log.

As noted above, the mobile transceiver 102 may also use one or more of the sensors 130 to sense or measure an environment of the mobile transceiver 102 in response to an alarm. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log), which is stored in the memory 112. As with the location data, the mobile transceiver 102 may collect sensor data at regular intervals, in accordance with a predefined schedule, or in response to an alarm. The frequency or schedule at which sensor data is obtained may be fixed or configurable.

The mobile transceiver 102 attempts to connect to the asset tracking service 200 to report location and/or sensor data stored in the asset tracking log at regular intervals, in accordance with a predefined schedule, or in response to an alarm. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and do not coincide, although the cycles may overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 3:
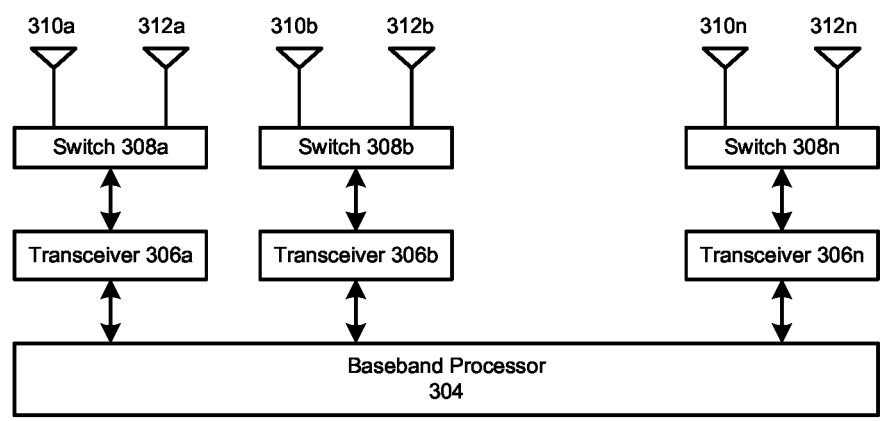
FIG. 3 is a block diagram illustrating a wireless communication subsystem in accordance with an example embodiment of the present disclosure.

Referring now to FIG. 3, a wireless communication subsystem 300 in accordance with an example embodiment of the present disclosure will be described. The wireless communication subsystem 300 includes a digital baseband processor 304 which manages functions that require an antenna, and a plurality of wireless transceivers and/or receivers 306, represented individually by references 306a, 306b, . . . 306n. Each of the wireless transceivers/receivers 306 is coupled to a switch 308, represented individually by references 308a, 308b, . . . 308n, which is coupled to an internal antenna 310, represented individually by references 310a, 310b, . . . 310n, and an external antenna 312, represented individually by references 312a, 312b, . . . 312n. The external antennas 312 typically serve as the primary antennas because of the reduced RF interference associated with being located outside of the shipping container 400, whereas the internal antennas 310 typically serve as secondary antennas because of the increased RF interference associated with being located inside of the shipping container 400.

It at least some embodiments, the external antennas 312 are provided in a common external antenna module, and a ground pin of the external antenna module is connected to a general-purpose input/output (GPIO) pin of the processor 104 which can be monitored, for example, when the mobile transceiver 102 wakes up. When the ground pin of the external antenna module is not detected, this is an indication that the external antenna module is disconnected, an electronic malfunction has occurred in the external antenna module, or the external antenna 312 and/or the external housing module 504 has been otherwise damaged or tampered with. In other embodiments, a ground pin of each external antenna 312 may be individually connected to a GPIO pin of the processor 104.

As noted above, the wireless transceivers/receivers 306 include at least one cellular transceiver 114 such as a multi-band cellular transceiver that supports multiple radio frequency bands which may include, for example, multiple 4G Long-Term Evolution (LTE) or LTE Advanced bands as well as global 3G and 2G bands and at least one satellite receiver 120.

While a common baseband processor 304 for the cellular transceiver 114 and satellite receiver 120 has been described, in other embodiments a separate baseband processor could be provided for the satellite receiver 120 and the cellular transceiver 114. In the wireless communication subsystem 300, the cellular transceiver 114 and satellite receiver 120 are individually switched and capable of operating independently. Consequently, the satellite receiver 120 can use an external antenna 312 while the cellular transceiver 114 uses an internal antenna 310, or vice versa, the satellite receiver 120 and the cellular transceiver 114 can both use an external antennas 312, or the satellite receiver 120 and the cellular transceiver 114 can both use an internal antennas 30. The baseband processor 304, or main processor 104, selects either the internal antenna 310 or external antenna 312 for the satellite receiver 120 and the cellular transceiver 114 depending on factors such as signal quality and ancillary information from the sensors 130. Each of the wireless transceivers/receivers 306 (e.g., the satellite receiver 120 and the cellular transceiver 114) may also be separately powered-on, powered-off or placed into a sleep mode.

While not shown, each of the wireless transceivers/receivers 306 has an RF front end circuit (also known as a transceiver module/receiver module) which generally includes all components between the antennas and the digital baseband processor 304. For example, the RF front end circuit of a cellular transceiver includes a receiver, a transmitter, and local oscillators (LOs). The receiver performs common receiver functions as signal amplification, frequency down conversion, filtering, channel selection, etc., as well as analog-to-digital conversion (ADC). The ADC of a received signal allows more complex communication functions such as demodulation and decoding to be performed by the digital baseband processor 304. In a similar manner, signals to be transmitted are processed, including modulation and encoding, for example, by the digital baseband processor 304. The processed signals are input to the transmitter for digital-to-analog conversion (DAC), frequency up conversion, filtering, amplification, and transmission via the antennas. A receiver, lacking transmitting functions, typically omits components required for receiving.

The mobile transceiver 102 is intended to be attached to, or incorporated in, a moveable asset to track its location using a satellite receiver 120 as well as sensing or measuring other conditions, such as temperature, humidity, general operating conditions, average speed, maximum speed, content status, door open or closed condition, etc. using the sensors 130. The asset tracked by the mobile transceiver 102 may be a shipping container, truck, rail car, automobile, etc.

Tracking requirements for tracking assets may vary depending on the mode of transportation (e.g., ship, rail, car, and possibly air). For example, if the mobile transceiver 102 is attached to an asset that is being moved by rail, the logging and/or reporting may be at longer intervals than if the asset was being moved by truck through town streets. Also, different sensors 130 may be monitored depending on the mode of transportation. For example, there may be no need to check for door open or close status while mobile transceiver 102 is being moved by ship.

The mobile transceiver 102 has a device configuration which defines alarms (e.g., wakeup or trigger events) which wake up the mobile transceiver 102 from an inactive mode (e.g., sleep mode) to determine the device status, including location and/or environmental conditions at a particular time, and report the device status to the asset tracking service 200. The alarms events may be scheduled events, for example based on a time of day or frequency, or unscheduled events which asynchronously wake up the mobile transceiver 102 to report the device status. The mobile transceiver 102 is in a sleep mode much of the time to conserve power and wakes up in response to alarms. For example, the mobile transceiver 102 may wake up only at predetermined time intervals or due to detections or measurements by the sensors 130. When the mobile transceiver 102 wakes up from sleep mode, the mobile transceiver 102 typically determines its location using the satellite receiver 120 and/or measures one or more environmental conditions using one or more of the sensors 130, stores the measured data in a data log in memory 112, and then reports the device status to the asset tracking service 200, for example, by sending at least a portion of a data log to the asset tracking service 200 over the Internet via the cellular transceiver 114. For example, the mobile transceiver 102 may wake up every hour to determine and report the device status, or the mobile transceiver 102 may wake up when a door of the shipping container to which it is attached is opened. When the mobile transceiver 102 wakes up, the mobile transceiver 102 may determine the reason for the alarm. The mobile transceiver 102 may then determine its location using the satellite receiver 120 and/or measure one or more environmental conditions based on the alarm type. The mobile transceiver 102 may then transmit the measured data to the asset tracking service 200. The mobile transceiver 102 then goes back to into the sleep mode until it wakes up in response to another alarm.

Each alarm is defined by a number of parameters that includes an identifier (ID) such as a unique number to identify the alarm, an alarm type that identifies a type of the alarm, one or more condition parameters to be satisfied for the alarm to be triggered, and one or more actions to take when the alarm is triggered. The alarm types are typically based on either time or sensor data. There are two sub-types of time-based alarms. The first type of timed based alarm is frequency which specifies a frequency at which data is to be measured, the condition parameters for the alarm checked and reported to the asset tracking service 200. An example value for the frequency alarm is every 15 minutes. The second type of time based alarm is time (or date) which specifies a time and/or date at which the condition parameters for the alarm are checked. An example value for the frequency alarm is 12:00 PM every day. The sensor-based alarms are defined based on the capabilities of the mobile transceiver 102, i.e. the onboard sensors 130. The sensor-based alarms may include temperature, humidity, pressure, movement detection, location, location within or with respect to a specific geo-fence, door open or closed condition, etc. The alarm types may also be based on other factors such as location or location history. A geo-fence is a virtual perimeter defined by a particular geographic area using geo-spatial coordinates, such as Latitude and Longitude, used by the satellite receiver 120. A geo-fence may be fixed or dynamically generated, for example, a radius around a particular point location. The geo-fence may be a predefined set of boundaries, or may be a set of zones or areas which need not be adjacent. The alarm actions may include the type of sensor data to measure and transmit to the asset tracking service 200 and possibly other things like running diagnostics, changing device state, location data, etc.

Figure 5:
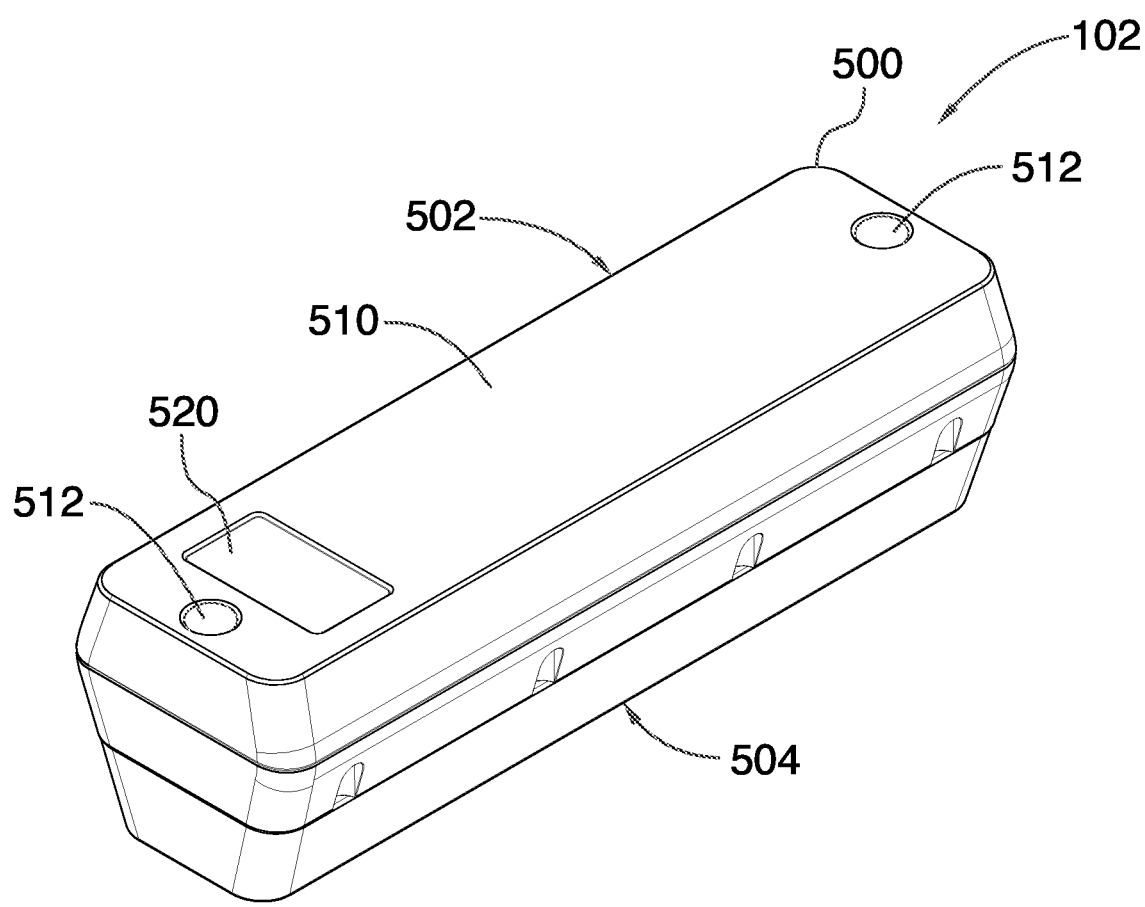
FIG. 5 is a perspective view of a mobile transceiver housing in accordance with one embodiment of the present disclosure.

FIG. 5 illustrates a mobile transceiver housing 500 of the mobile transceiver 102 in accordance with one example embodiment of the present disclosure. The housing 500 is a two-part, interconnected module, configured to be mounted to a shipping container, for example, through a door of the shipping container. The housing 500 comprises an internal module 502 and an external module 504. The internal module 502 is configured to be mounted on the interior of the shipping container, for example, on an inside surface of a door of the shipping container. The external module 504 is configured to be mounted on the exterior of the shipping container, for example, on an outside surface of the door of the shipping container. The external module carries the external antennas 312. The internal module carries the internal antennas 310, and most of the other electronic components of the mobile transceiver 102.

The internal module 502 and external module 504 are connected to each other, for example, by mounting screws (or bolts) when mounted to a shipping container 400 or other asset. A pair of mounting screws is used in the shown embodiment. A different number of mounting screws could be provided in other embodiments. In preparation for mounting the mobile transceiver 102, three holes are formed in the door of the shipping container using drilling or the like. Alternatively, the holes may be performed in the shipping container. Two of the holes are provided to receive the mounting screws while the third hole is used to pass through electronics from the internal module 502, such as external antennas for the cellular transceiver 114 and satellite receiver 120 and associated circuitry, to be carried in the external module 504 in the mounted mobile transceiver 102. In the shown embodiment, two holes 512 are formed in the front panel 510 of the internal module 502 for receiving the mounting screws. Corresponding holes are located in the bottom of the internal module 502. A hole in the bottom of the internal module 502 is also provided for receiving the electronics. The front panel 510 of the internal module 502 also includes a light transmissive panel 520, such as a transparent panel.

The housing 500 defines a sensor compartment for receiving at least some of the sensors 130 located opposite to the transmissive panel 520. The sensor compartment carries the light sensor 131 and the one or more ToF sensors 137. In the described embodiment, two ToF sensors 137 are carried in the sensor compartment. In some embodiments, one ToF sensor 137 may be configured for long-range sensing and the other ToF sensor 137 may be configured for short-range sensing. In some embodiments, the measuring range of the ToF sensors 137 may be configurable, for example, using software. In at least some embodiments, each ToF sensor 137 comprises an integrated circuit (IC), a light emitting diode (LED) emitter, and a LED received. The ToF sensors 137 may be mounted together with the light sensor 131 on a printed circuit board (PCB), such as a flexible PCB, carried in the sensor compartment.

The light sensor 131 is configured and positioned within the sensor compartment for sensing light outside of the mobile transceiver 102 through the transmissive panel 520. The first sensor 137 is configured and positioned within the sensor compartment for detecting objects in a first direction through the transmissive panel 520 outside of the mobile transceiver 102, i.e. within the interior of the shipping container when the mobile transceiver 102 is mounted to the shipping container. For example, the first ToF sensor 137 may be used for detecting objects within the interior of the shipping container by measuring the distance between the mobile transceiver 102 and the nearest object in the first direction, and determining whether the shipper container is loaded (e.g., one or more objects detected) or unloaded (e.g., no objects detected). The second ToF sensor 137 is configured and positioned within the sensor compartment for measuring the distance in a second direction between the second ToF sensor 137 and an inside surface of the front panel 510. The distance between the second ToF sensor 137 and an inside surface of the front panel 510 should be fixed. A change in the distance measured by the second ToF sensor 137, such as increase in the sensed distance, provides an indication of an abnormal antenna condition of the external antenna in that the external module 504 may be damaged or may have been tampered with. In the described embodiment, the ToF sensors 137 are configured to face opposite directions so that one sensor measures distance and the other sensor is used to detect the presence or absence of the external antenna module. Alternatively, in other embodiments the ToF sensors 137 may be configured to face the same direction and measure distance in different ranges, i.e., short range and long range, for increased accuracy. Alternatively, two ToF sensors 137 may be configured to face the same direction and measure distance in different ranges while one or more ToF sensors face the opposite direction to detect the presence or absence of the external antenna module.

Figure 4:
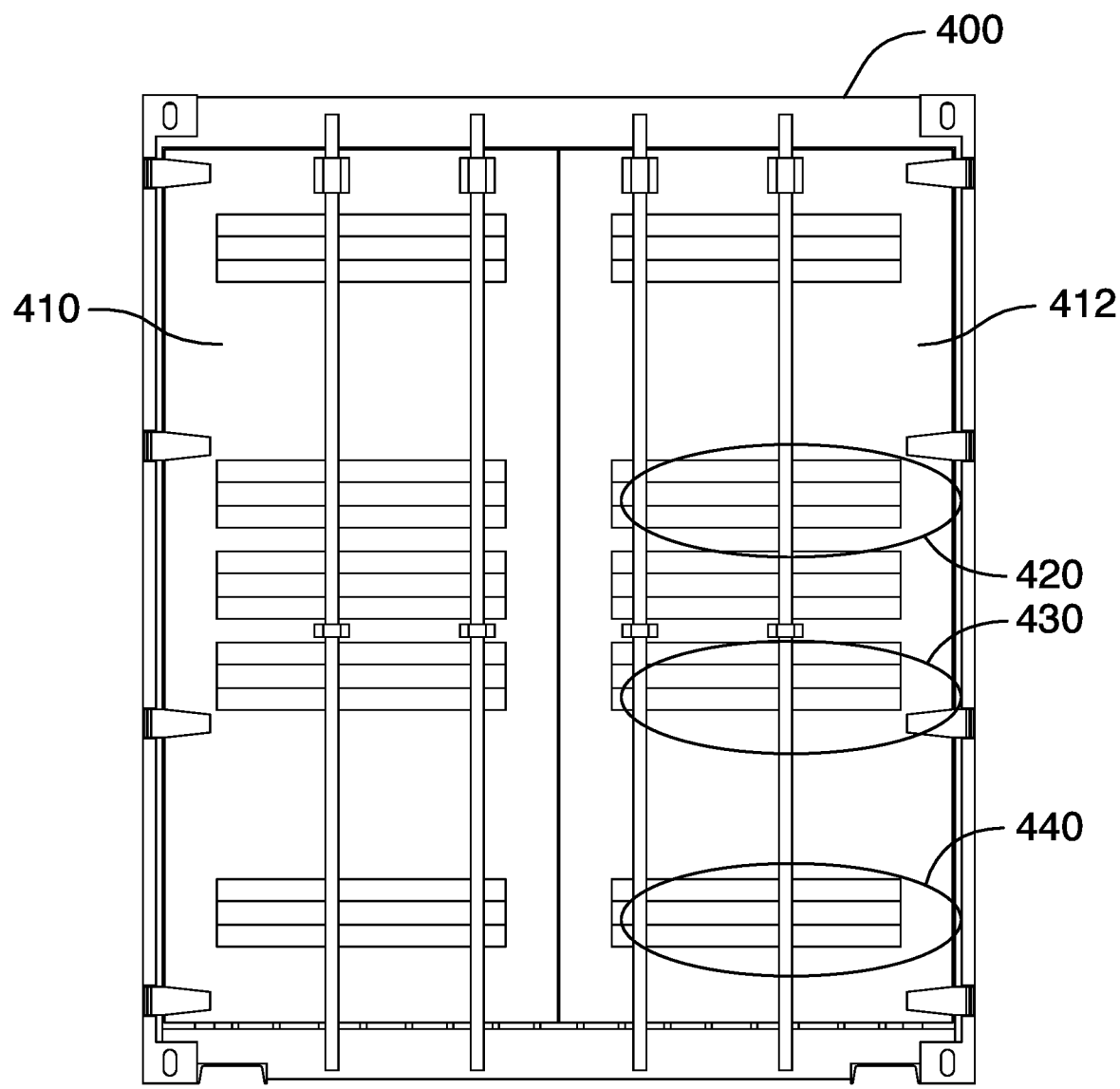
FIG. 4 is an example shipping container suitable for mounting a mobile transceiver in accordance with the present disclosure.

FIG. 4 illustrates an example shipping container 400 suitable for mounting the mobile transceiver 102. The shipping container 400 includes a pair of interlocking doors 410, 412. The mobile transceiver 102 is mounted through one of the doors 410, 412 with the internal module 502 on the inside of the door 410 or 412, and the external module 504 on the outside of the door 410 or 412. Suitable mounting locations for the mobile transceiver 102 on the door 412 are represented by references 420, 430 and 440. While example mounting locations for the mobile transceiver 102 are located on the door 412, it will be appreciated that the mobile transceiver 102 could be mounted on any door of the shipping container 400, or possibly a wall of the shipping container 400. Mounting screws 610 are received in the mounting holes 512 in the front panel 510 of internal module 502 of the mobile transceiver housing 500, and are secured in thread holes (not shown) on the inside of the external module 504 of the mobile transceiver housing 500. In some embodiments, the internal module 502 and external module 504 may be further secured to the container door 412 using a suitable mounting adhesive, such as a suitable double-sided adhesive strip or tape.

Figure 6A:
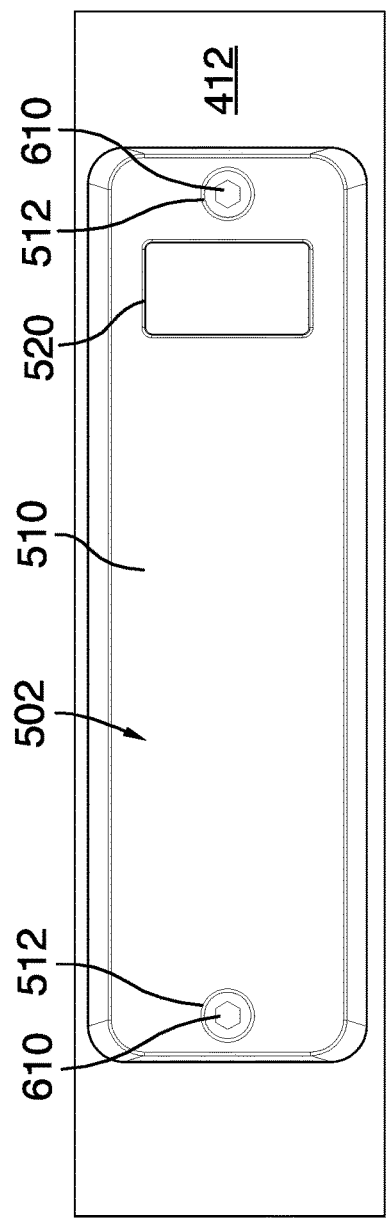
FIG. 6A is a front view of the mobile transceiver housing of FIG. 5 mounted to a door of the shipping container of FIG. 4 viewed from the interior of the shipping container.
Figure 6B:
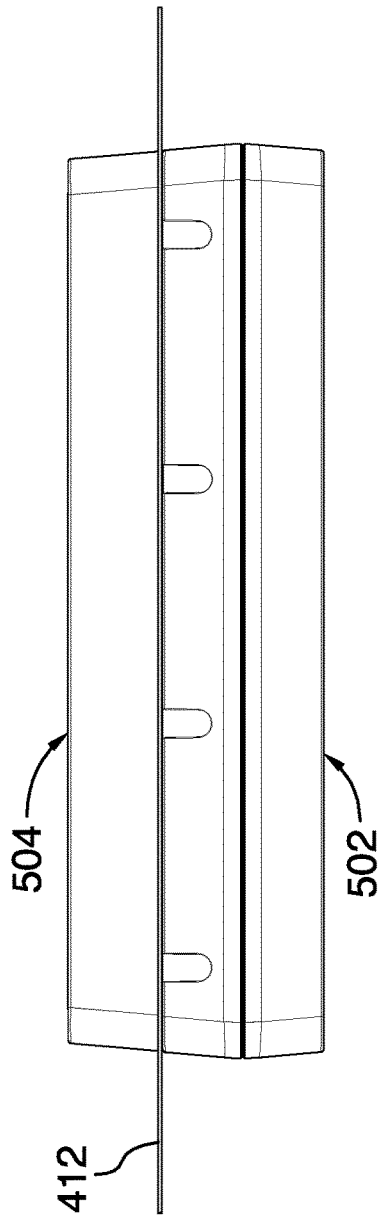
FIG. 6B is a side view of the mobile transceiver housing of FIG. 5 mounted to a door of the shipping container of FIG. 4.
Figure 6C:
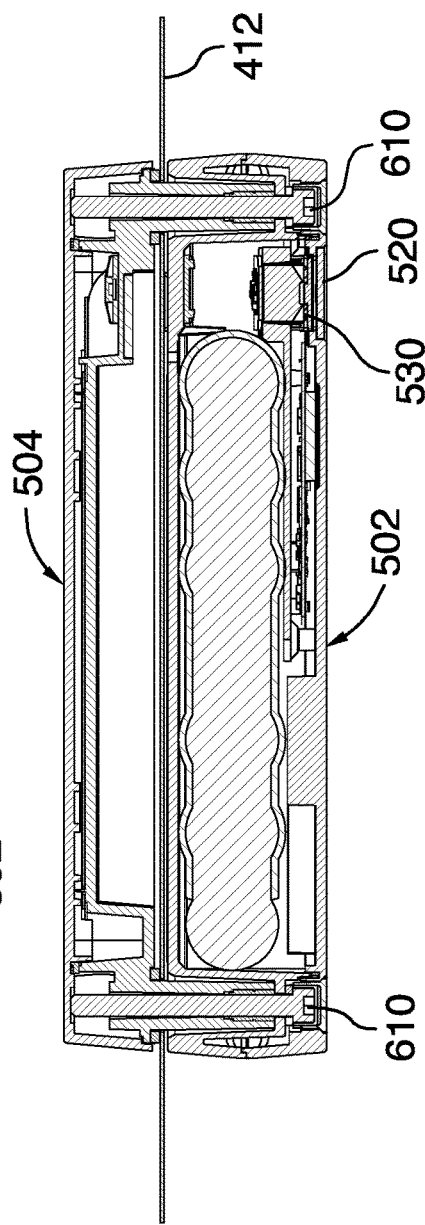
FIG. 6C is a sectional view of the mobile transceiver housing of FIG. 5 mounted to a door of the shipping container of FIG. 4.

FIG. 6A to 6C illustrate the mobile transceiver 102 mounted to the door 412 of the shipping container 400. FIG. 6A is a front view of the mobile transceiver housing 500 mounted to the door 412 of the shipping container 400. FIG. 6B is a side view of the mobile transceiver housing 500 mounted to the door 412 of the shipping container 400. FIG. 6C is a sectional view of the mobile transceiver housing 500 mounted to a door of the shipping container 400. The sensor compartment for receiving the light sensor 131 and ToF sensors 137 is represented by reference 530, and is located opposite to the transmissive panel 520.

Multi-SIM Selection

Figure 7:
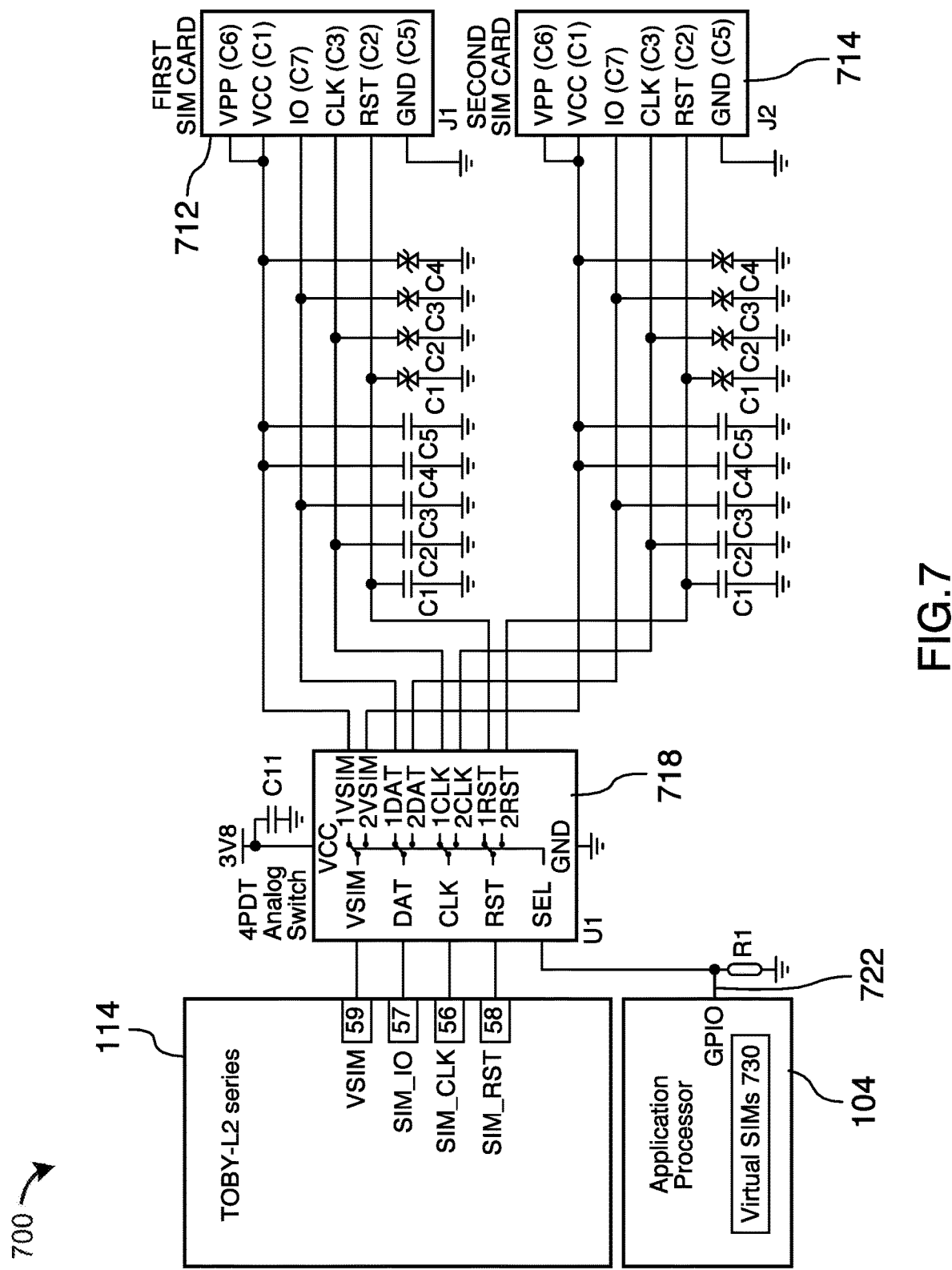
FIG. 7 is a block diagram of a SIM card selection circuit in accordance with one embodiment of the present disclosure.

Reference is now made to FIG. 7, which illustrates a SIM card selection circuit 700 in accordance with one embodiment of the present disclosure. The circuit 700 comprises a physical or virtual SIM cards which are coupled to the cellular transceiver 114 and processor 104 via a switch 718. The SIMs may be physical or virtual SIMs. In the described embodiment, the circuit 700 comprises two SIM cards, represented by references 712 and 714 which are coupled to the cellular transceiver 114 via a 4-port analog switch 718. In other embodiments, more than two SIM cards may be coupled to the cellular transceiver 114. If more than one cellular transceiver 114 is provided, each cellular transceiver 114 may have a physical or virtual SIM cards coupled thereto via a respective switch.

In the described embodiment, the SIM cards 712, 714 share a common cellular transceiver 114 and baseband processor 304 or baseband circuit. Each of SIM cards 712, 714 may be associated with different wireless service provider or providers (also known as "wireless carriers"). The SIM cards 712, 714 may be preferred for particular geographical regions, for example, based on the wireless service providers associated with the SIM cards 712, 714 in those geographical regions. The geographical regions may be differentiated based on country or region (e.g. Asia Pacific, Europe, the Middle East and Africa (EMEA), North America, South America, etc.).

The processor 104 uses the switch 718 to select and switch between the SIM cards 712, 714 used by the cellular transceiver 114. In the described embodiment, the processor 104 is connected to the switch 718 by a GPIO pin 722. In the described embodiment, the switch 718 is a 4-port analog switch including a VSIM port for connecting to a VSIM pin of the cellular transceiver 114 used for SIM supply output, a data (DAT) port for connecting to a SIM_IO port of the cellular transceiver 114 used for SIM data input/output (I/O), a clock (CLK) port for connecting to a SIM_CLK port of the cellular transceiver 114 used for SIM clock output, and a reset (RST) port for connecting to a SIM_RST port of the cellular transceiver 114 used for SIM reset output which resets the cellular transceiver 114. While a hardware switch is used in the described embodiment, a software switch could be used instead of a hardware switch in other embodiments. The software switch could be implemented by software executed by the processor 104.

While physical SIM cards are used in the described embodiment, virtual SIM cards 730 may be provided in other embodiments rather than physical SIM cards. When virtual SIM cards 730 are provided, the switching may be done via software by the transceiver module or processor 104.

Figure 8A:
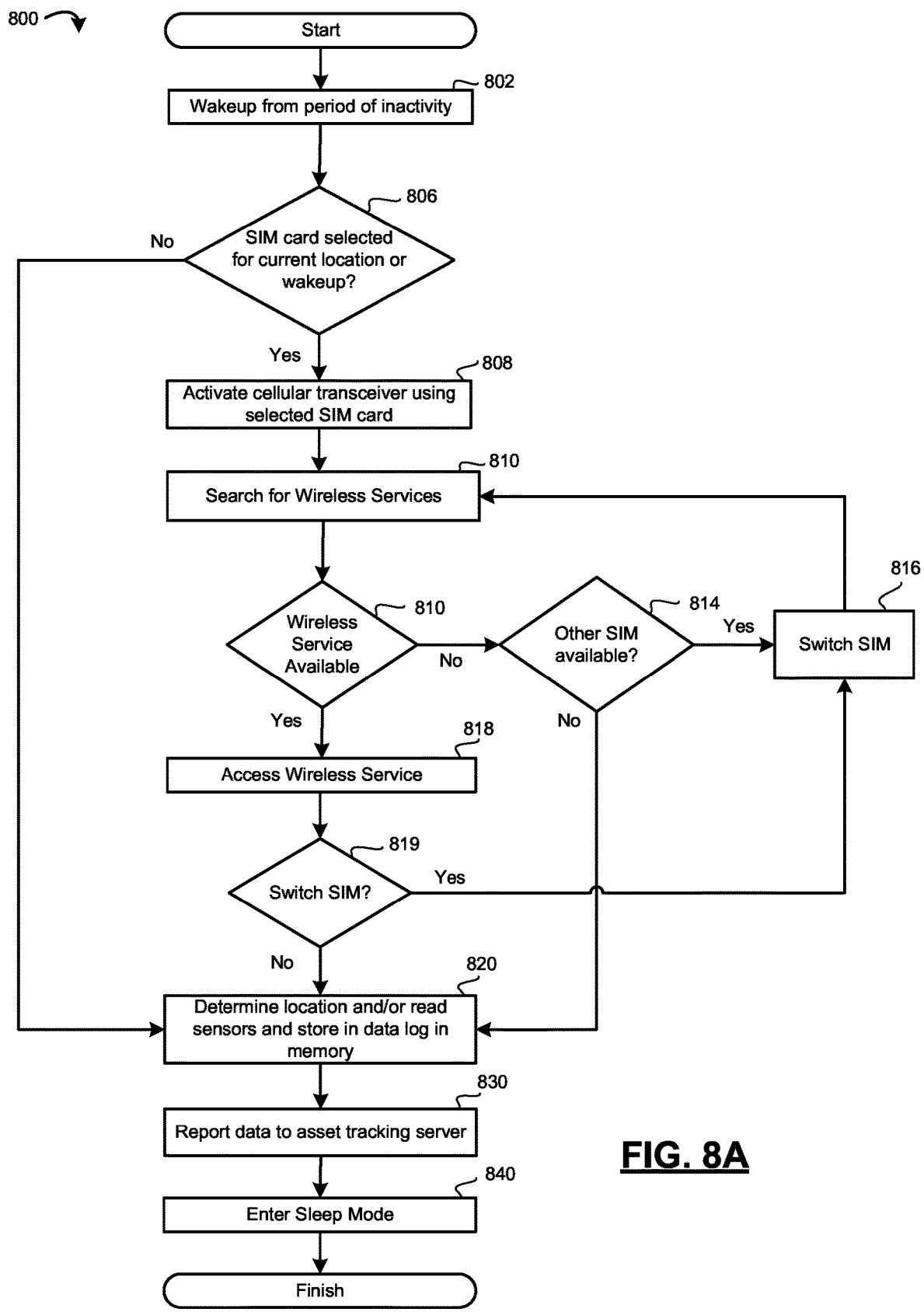
FIGS. 8A and 8B are flowcharts illustrating a method of selecting a SIM card of a mobile transceiver in accordance with embodiments of the present disclosure.

FIG. 8A illustrates a flowchart of a method 800 of selecting a SIM card of a mobile transceiver 102 such as a GNSS tracking device in accordance with one example embodiment of the present disclosure. The method may be carried out by software executed by a processor of the mobile transceiver 102. Coding of software for carrying out such a method 800 is within the scope of a person of ordinary skill in the art provided the present disclosure. The method 800 may contain additional or fewer processes than shown and/or described, and may be performed in a different order in other embodiments. Machine readable code executable by the processor to perform the method 800 may be stored in a machine readable medium such as a memory of the mobile transceiver 102.

At 802, the mobile transceiver 102 wakes up from a low power mode after a period of inactivity. For example, the mobile transceiver 102 may wake up from a sleep mode in response to a wakeup event (also described herein as an alarm). The alarm which caused the wake up may be a time-based alarm or sensor-based alarm.

At 806, the mobile transceiver 102 determines whether a SIM card has been pre-selected for a location of the mobile transceiver 102 or the wakeup event. When a SIM card has been pre-selected, the pre-selected SIM card is selected as a first subscriber identity module (SIM) card 712 and operations proceed to 808. In some embodiments, determining whether a SIM card has been pre-selected comprises determining whether the wakeup event corresponds to a waypoint in a travel itinerary (or route to be followed by the asset/mobile transceiver 102). In some embodiments, a travel itinerary may be provided to the mobile transceiver 102 by the asset tracking service 200. The travel itinerary defines a number of waypoints including an origin, destination and possibly intermediate waypoints along the intended route and optionally an expected time at the various waypoints based on the mode of transportation.

The travel itinerary may be downloaded from the asset tracking service 200 at or before the beginning of a trip. The asset tracking service 200 may also send instructions/command to the mobile transceiver 102 which configure time-based wakeup events on the mobile transceiver 102 which wake up the mobile transceiver 102 from a low power mode at predetermined times and/or predetermined frequencies. The asset tracking service 200 may also pre-select a SIM card for waypoints in the travel itinerary and/or pre-select a SIM card for geographical areas for the mobile transceiver 102 to use based on the current time, time-zone and geographical area of the mobile transceiver 102 at a pre-programmed wakeup event. The pre-selected SIM represents a preferred SIM card. If there is no wireless (cellular) coverage while in transit, the mobile transceiver 102 may be configured not to activate the cellular transceiver 114, thereby conserving computing and power resources. In a long-range application in which the mobile transceiver 102 may be out of wireless coverage for an extended period of time, one or more pre-programmed wakeup events at intervals along the route may also be provided for data logging only using the satellite receiver 120 to obtain a location fix and/or sensors 130 to obtain environmental data. An example travel itinerary is provided below in Table 1.

TABLE 1

Example travel itinerary

| Event | Waypoint | SIM | Region |
|---|---|---|---|
| 1 | Origin | SIM 1 | Asia Pacific |
| ... | In transit | None - No coverage - do not activate | Asia Pacific |
| n − 1 | In transit | SIM 2 | EMEA |
| N | Destination | SIM n | North America |

In the example travel itinerary in Table 1, the travel itinerary includes a number of wakeup events each including a number of parameters including, a wakeup event identifier or descriptor, a waypoint descriptor, a pre-selected SIM card, and a location (e.g., geographical region). In other embodiments, an expected time based on the mode of transportation may also be provided. The available wireless coverage for the particular geographic location and/or a preferred wireless carrier, from a list of available carriers associated with each SIM card (if there is more than one wireless carrier) may also be specified in the travel itinerary.

While the travel itinerary has being described has including certain data items and having a certain data structure, the present disclosure is not intended to be limited to the described data structure. Any data structure in which the described data items are provided and associated with each other may be used, whether those data items are stored in a travel itinerary or elsewhere.

When the wakeup event corresponds to a waypoint in a travel itinerary, the mobile transceiver 102 may determine whether a SIM card has been pre-selected for the particular waypoint. This step is optional and used in embodiments in which the travel itinerary includes at least some of the waypoints for which no SIM card is pre-selected. A SIM card may not be pre-selected for a particular waypoint for a variety of reasons. For example, the waypoint may be in a location for which there is no coverage (e.g., at sea). However, the waypoint may still be of interest for data logging purposes, for example, for acquiring location data via the satellite receiver 120 and/or sensor data via one or more sensors 130 and storing the acquired location data and/or sensor data in a data log in a memory 112 of the mobile transceiver 102. When a SIM card has been pre-selected for the particular waypoint, the SIM card associated with the particular waypoint is selected as the first SIM card.

In other embodiments, determining whether a SIM card has been pre-selected comprises determining a location of the mobile transceiver 102. The location maybe determined via the satellite receiver 120. Alternatively, the location may be determined by determining an expected location of the mobile transceiver from the travel itinerary in accordance with the current time. Optionally, the mobile transceiver 102 may determine whether the determined location of the mobile transceiver corresponds to a waypoint in the travel itinerary. When the determined location corresponds to a location or waypoint in the travel itinerary, the mobile transceiver 102 determines whether a SIM card has been pre-selected for the location or waypoint in the travel itinerary. When a SIM card has been pre-selected for the particular location or waypoint, the SIM card associated with the particular location or waypoint is selected as the first SIM card.

When more than one wireless service is available, for the selected SIM, the mobile transceiver 102 may select a wireless service from the available wireless services in accordance with a location of the mobile transceiver or a waypoint associated with the wakeup event and a list of preferred wireless services for a plurality of locations or waypoints of a travel itinerary.

In other embodiments, it is contemplated that the decision block 806 could be omitted and a SIM card may be selected by the mobile transceiver 102 in alternate embodiments in which SIM cards are not pre-selected.

At 808, the mobile transceiver 102 activates the cellular transceiver 114 from a low power mode using the first SIM card. This causes the mobile transceiver 102 and the cellular transceiver 114 to use the subscriber identity data of the first SIM card. The mobile transceiver 102 may activate the satellite receiver 120 from a low power mode at this time or when needed. For example, the mobile transceiver 102 may wake up the satellite receiver 120 from a sleep mode. The activating of the cellular transceiver 114 and optionally satellite receiver 120 may be performed, for example, by the main processor 104 or the baseband processor 304, depending on the embodiment.

At 810, the cellular transceiver 114 searches for wireless services associated with the first SIM card 712. The cellular transceiver 114 may search for an available wireless signal based on a preferred wireless carrier from a list of available carriers associated with each SIM card specified in the travel itinerary based on the particular location or waypoint. Alternatively, the cellular transceiver 114 may search for an available wireless signal based on a stored table of supported wireless services, such as a profile efficiency table. For example, when the wireless transceivers comprises a multi-band cellular transceiver 114 supporting 4G LTE, 3G and 2G is carried by the mobile transceiver 102, the cellular transceiver 114 searches (e.g., scans) for 4G LTE, 3G and 2G cellular data services.

At 812, the mobile transceiver 102 determines whether wireless services are available based on whether any response to the scans are received, for example, from base stations or nodes in a cellular network 160. When a wireless service is not available, operations proceed to 814 at which the mobile transceiver 102 determines whether any other SIM cards are available, for example, any SIM cards which have not yet been attempted since the wakeup was triggered.

When another SIM card is available, operations proceed to 816 at which the mobile transceiver 102 switches from the first SIM card 712 to a different SIM card in the physical or virtual SIM cards, such as the second SIM card 714. The cellular transceiver 114 is typically reset (e.g., restarted/re-activated) after switching the SIM card. Optionally, the process of switching SIMs may require the step of switching SIM power and RF front-end circuits which are shared between the SIM cards. Operations then proceed to 810 at which the cellular transceiver 114 searches for wireless services associated with the second SIM card 714.

When another SIM card is not available, the mobile transceiver 102 may determine its location and/or sense an environment of the mobile transceiver 102, saved the acquired data, and enter a low power mode. Alternatively, the mobile transceiver 102 may enter a low power mode without data logging in other embodiments.

When a wireless service is available, operations proceed to 818 at which the mobile transceiver 102 accesses, or connects to, a wireless service from the available wireless services. The mobile transceiver 102 may optionally compare the available wireless coverage and wireless network provider at each point along the route specified in the travel itinerary provided by the asset tracking service 200 to the capabilities of the on-board SIMs, determine a preferred SIM and/or wireless service (carrier) and store the preferred selections for future use.

At 819, the mobile transceiver 102 may optionally determine whether a SIM switch should be performed. Example methods of switching SIM cards in accordance with embodiments of the present disclosure are described below in connection with FIGS. 9A and 9B.

At 820, the mobile transceiver 102 may determine its location using the satellite receiver 120 and store the determined location and a time associated with the determined location in the data log stored in the memory 112. The mobile transceiver 102 may sense, via one or more of the sensors 130, an environment of the mobile transceiver 102, and store the sensor data obtained via the sensors 130 and a time at which the sensor data was obtained in the data log stored in the memory 122.

At 830, the mobile transceiver 102 may report (e.g., send) measured and/or logged data to the asset tracking service 200. The mobile transceiver 102 sends at least a portion of the data log to the asset tracking service 200 using the wireless service.

At 840, after the mobile transceiver 102 has sent at least a portion of the data log to the asset tracking service 200 using the wireless service, a low power mode is initiated for the cellular transceiver 114 and/or satellite receiver 120, or possibly the entire mobile transceiver 102 until the next alarm (e.g., logging and/or reporting cycle). In addition to the cellular transceiver 114 and/or satellite receiver 120, one or both of the processor 104 and sensors 130 may enter a low power mode.

Returning to decision block 806, when a SIM card has not been pre-selected, the mobile transceiver 102 determines its location and/or senses an environment of the mobile transceiver 102, saves the acquired data, and enters a low power mode. Alternatively, the mobile transceiver 102 may enter a low power mode without data logging in other embodiments. Alternatively, when a SIM card has not been pre-selected, a last used SIM card in the physical or virtual SIM cards is selected as the first SIM card. Alternatively, when a SIM card has not been pre-selected, a last used SIM card in the physical or virtual SIM cards is selected as the first SIM card.

Figure 8B:
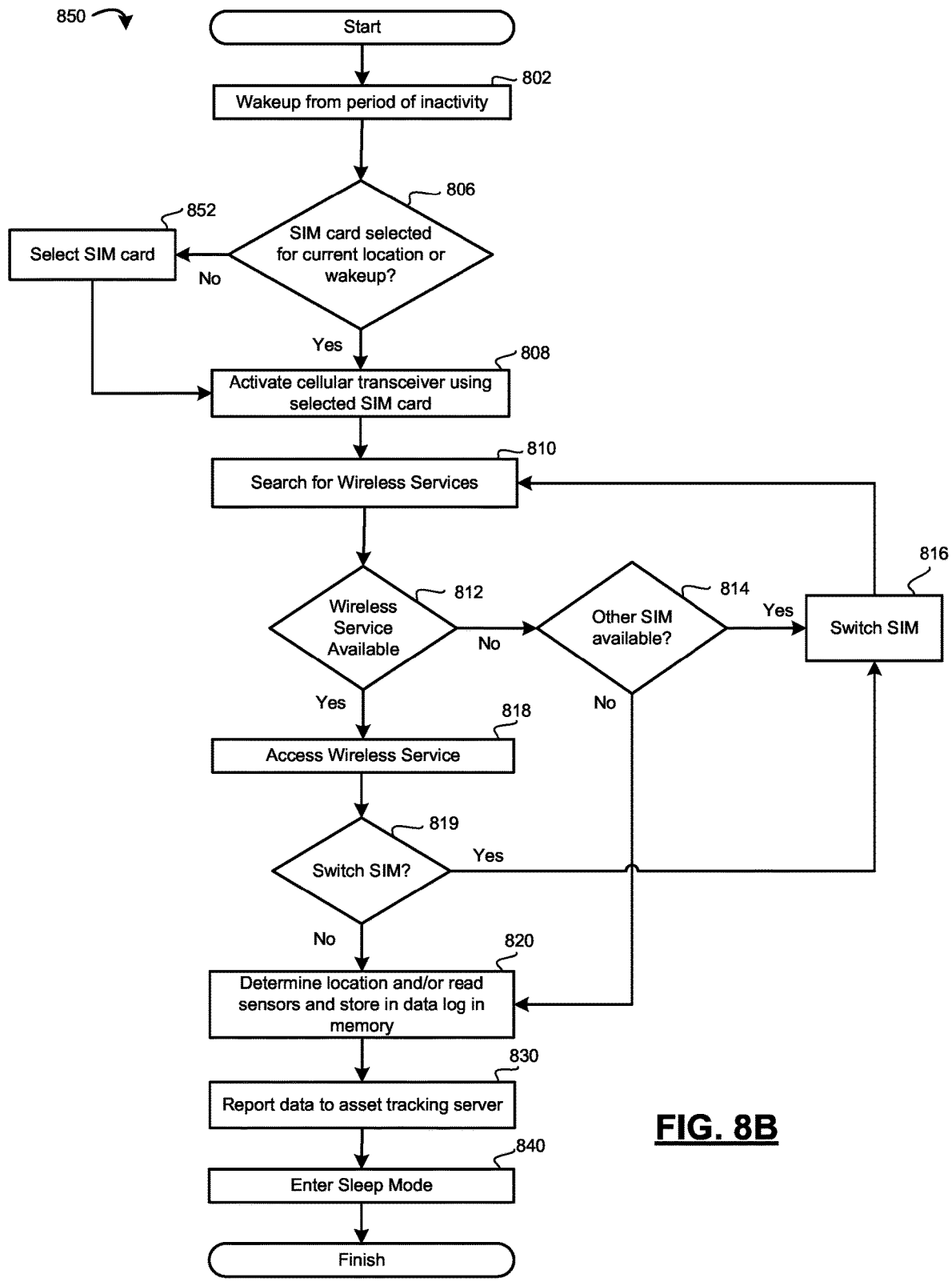

FIG. 8B illustrates a flowchart of a method 850 of selecting a SIM card of a mobile transceiver 102 such as a GNSS tracking device in accordance with one example embodiment of the present disclosure. The method 850 is similar to the method 800 described above except that when a SIM card has not been pre-selected, the operations proceed to 852 at which the mobile transceiver 102 selects a SIM card from a physical or virtual SIM cards as the first SIM card. In some embodiments, a last used SIM card in the physical or virtual SIM cards is selected as the first SIM card when a SIM card has not been pre-selected. In other embodiments, selecting a SIM card from a physical or virtual SIM cards as the first SIM card comprises determining a location of the mobile transceiver 102, and a SIM card is selected from a physical or virtual SIM cards as the first SIM card in accordance with the determined location of the mobile transceiver 102.

Figure 9A:
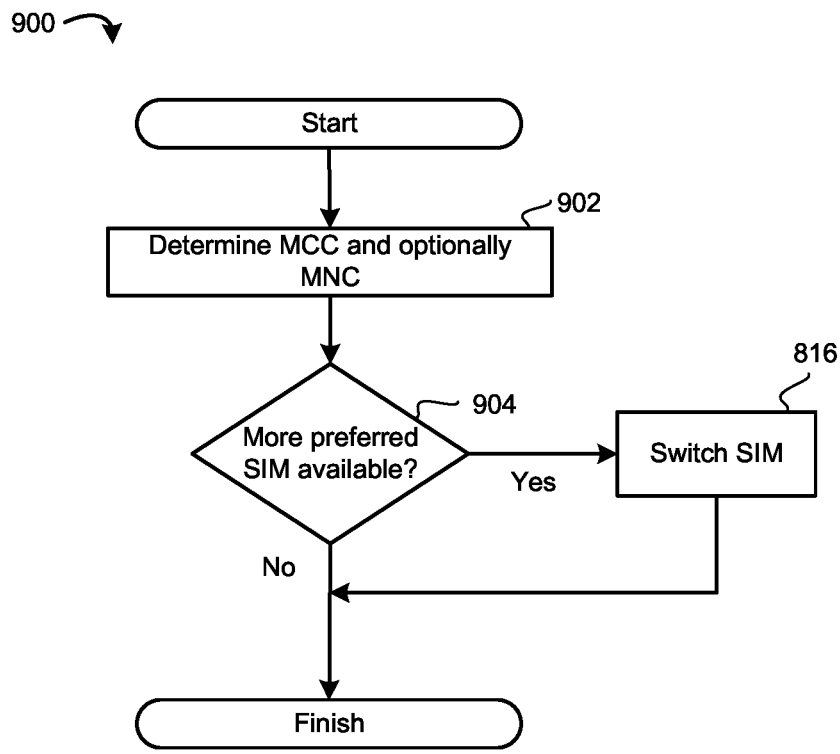
FIGS. 9A and 9B are flowcharts illustrating a method of switching SIM cards of a mobile transceiver in accordance with embodiments of the present disclosure.

Example methods of switching SIM cards in accordance with embodiments of the present disclosure will now be described in connection with FIGS. 9A and 9B. FIG. 9A illustrates a flowchart of a method 900 of switching SIM cards of a mobile transceiver 102 such as a GNSS tracking device in accordance with one example embodiment of the present disclosure. The method may be carried out by software executed by a processor of the mobile transceiver 102. Coding of software for carrying out such a method 900 is within the scope of a person of ordinary skill in the art provided the present disclosure. The method 900 may contain additional or fewer processes than shown and/or described, and may be performed in a different order in other embodiments. Machine readable code executable by the processor to perform the method 900 may be stored in a machine readable medium such as a memory of the mobile transceiver 102.

At 902, the mobile transceiver 102 determines a mobile country code (MCC) to identify a mobile network operator (carrier) associated with each response. In some embodiments, the mobile transceiver 102 determines a MCC and a mobile network code (MNC) from the responses received to the scanning to uniquely identify a mobile network operator (carrier), sometimes referred to as MCC/MNC tuple. The ITU-T Recommendation E.212 defines mobile country codes as well as mobile network codes.

At 904, the mobile transceiver 102 determines whether a preferred SIM is available based on the MCC and possibly the MNC for each of the responses received. When a SIM preferred is available, operations proceed to 816 at which the mobile transceiver 102 switches to a different SIM card in the physical or virtual SIM cards, such as the second SIM card 714. When a SIM preferred is not available, operations may proceed to 820 or possibly to the method 910.

While the method 900 is shown as occurring after the mobile transceiver 102 accesses, or connects to, a wireless service from the available wireless services in the present embodiment, it could be performed before this occurs in other embodiments.

Figure 9B:
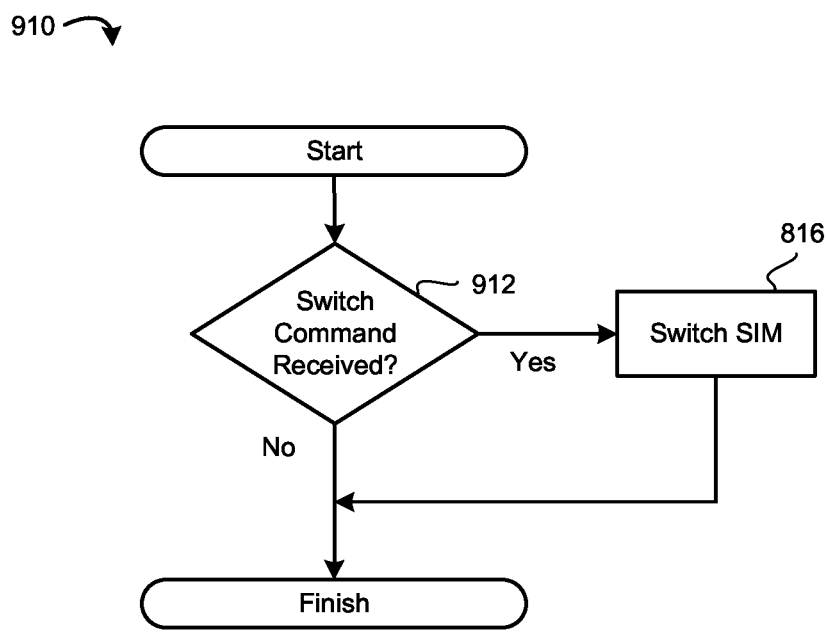

FIG. 9B illustrates a flowchart of a method 910 of switching SIM cards of a mobile transceiver 102 such as a GNSS tracking device in accordance with one example embodiment of the present disclosure. The method may be carried out by software executed by a processor of the mobile transceiver 102. Coding of software for carrying out such a method 910 is within the scope of a person of ordinary skill in the art provided the present disclosure. The method 910 may contain additional or fewer processes than shown and/or described, and may be performed in a different order in other embodiments. Machine readable code executable by the processor to perform the method 910 may be stored in a machine readable medium such as a memory of the mobile transceiver 102.

At 912, the mobile transceiver 102 determines whether a switch command is received from the asset tracking service 200. The switch command includes a command or instruction to switch from the current SIM card to the alternate SIM card, and typically specifies the alternate SIM card to be used by the mobile transceiver 102. The switch command may be sent by the asset tracking service 200 for a variety of reasons. For example, the asset tracking service 200 may have information about preferred or more optimal wireless services associated with the SIM cards which is not available to the mobile transceiver 102 because the mobile transceiver 102 was not provided with such information or because information provided to the mobile transceiver 102 is out of date. For example, the alternate SIM card may be associated with an alternate carrier which may be preferred or more optimal because it is associated with the carrier of the user's home network and/or carriers that have an advantageous partnering agreement with the carrier of the user's home network. Alternatively, the alternate carrier may have a preferred or more optimal wireless service because it may have improved power efficiency, reliability, data throughout, bandwidth, or Quality of Service (QoS). The switch command from the asset tracking service 200 not only allows more current information to be used in selecting the wireless service, but also reduces power consumption on the mobile transceiver 102 by having the decision making as to the preferred or more optimal wireless service performed by the asset tracking service 200 instead of the mobile transceiver 102.

When a switch command is received, the operations continue to 816 at which the mobile transceiver 102 switches from the current SIM card to a different SIM card in the physical or virtual SIM cards. When a switch command is not received, the operations continue to 820.

While the methods 900 and 910 of switching SIM cards are described as occurring in a particular order, it is contemplated that the methods could be performed in any order, that only one of the methods may be performed in other embodiments, or that neither of the methods may be performed in other embodiments.

The above-described methods provide power efficient global and long-range tracking methods that allow preferred wireless services to be used based on the geographic area in which the mobile transceiver 102 is located or which expands the number of available wireless services by using multiple SIM cards. Optionally, the mobile transceiver 102 may automatically switch to an alternate SIM, chosen from a plurality of the available SIMs, based on location after obtaining a location fix, if the preferred SIM is not available, does not respond, or no SIM was specified. The above-described methods are particularly advantageous when the mobile transceiver 102 is provided with a non-rechargeable battery. The above-described methods are also particularly advantageous when a period of time has elapsed since the mobile transceiver 102 determined its location using the satellite receiver, for example, when the mobile transceiver 102 wakes up after a period of inactivity in which at least the satellite receiver and wireless transceiver were in a low power mode.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver, comprising:
    searching, via a cellular transceiver, for available wireless services associated with a first subscriber identity module (SIM) card of a plurality of SIM cards; and
    in response to a determination that a wireless service for the first SIM card is not available, switching from the first SIM card to a second SIM card of the plurality of SIM cards.

2. The method of claim 1, further comprising:
    activating a cellular transceiver from a low power mode in response to a wakeup event, wherein the cellular transceiver is activated using the first SIM card;
    when a wireless service for the first SIM card is available, determining whether the second or a different SIM card of the plurality of SIM cards is preferred to the first SIM card;

and switching from the first SIM card to the second SIM card or different SIM card when the second SIM card or different SIM card is preferred to the first SIM card.

3. The method of claim 1, further comprising:
waking up the cellular transceiver from a low power mode;
selecting the first SIM card from the plurality of SIM cards;
activating a cellular transceiver using the first SIM card; and
switching from the first SIM card to the second SIM card in the plurality of SIM cards when a wireless service for the first SIM card is not available.

4. The method of claim 1, wherein each of the plurality of SIM cards are either physical SIM cards or virtual SIM cards.

5. The method of claim 2, further comprising:
when the second SIM card or different SIM card is not available or does not respond or is not specified, automatically switching to an alternate SIM card that is either the first SIM card or another different SIM card in the plurality of SIM cards.

6. The method of claim 1, further comprising:
resetting the cellular transceiver using the second SIM card; and
searching, via the cellular transceiver for available wireless services associated with the second SIM card.

7. The method of claim 1, further comprising:
activating the cellular transceiver from a low power mode in response to a wakeup event, wherein the cellular transceiver is activated using the first SIM card.

8. A mobile transceiver, comprising:
a processor;
a memory coupled to the processor, the memory having stored thereon executable instructions for execution by the processor;
a cellular transceiver coupled to the processor;
wherein the executable instructions, when executed by the processor of the mobile transceiver, cause the mobile transceiver to:
search, via the cellular transceiver, for available wireless services associated with a first subscriber identity module (SIM) card of a plurality of SIM cards; and
in response to a determination that a wireless service for the first SIM card is not available, switching from the first SIM card to a second SIM card of the plurality of SIM cards.

9. The mobile transceiver of claim 8, wherein the executable instruction further cause the mobile transceiver to:
activate a cellular transceiver from a low power mode in response to a wakeup event, wherein the cellular transceiver is activated using the first SIM card;
when a wireless service is available, determine whether the second SIM card or a different SIM card of the plurality of SIM cards is preferred to the first SIM card; and
switch from the first SIM card to the second SIM card or different SIM card when the second SIM card or the different SIM card is preferred to the first SIM card.

10. The mobile transceiver of claim 8, wherein the executable instruction further cause the mobile transceiver to:
wake up the cellular transceiver from a low power mode;
select the first SIM card from the plurality of SIM cards;
activate the cellular transceiver using the first SIM card; and
switch from the first SIM card to the second SIM card in the plurality of SIM cards when a wireless service for the first SIM card is not available.

11. The mobile transceiver of claim 8, wherein each of the plurality of SIM cards are either physical SIM cards or virtual SIM cards.

12. The mobile transceiver of claim 9, wherein the executable instruction further cause the mobile transceiver to:
when the second SIM card or different SIM card is not available or does not respond or is not specified, automatically switch to an alternate SIM card that is either the first SIM card or another different SIM card in the plurality of SIM cards.

13. The mobile transceiver of claim 8, wherein the executable instruction further cause the mobile transceiver to:
reset the cellular transceiver using the second SIM card; and
search, via the cellular transceiver, for available wireless services associated with the second SIM card.

14. The mobile transceiver of claim 8, wherein the executable instruction further cause the mobile transceiver to:
activate the cellular transceiver from a low power mode in response to a wakeup event, wherein the cellular transceiver is activated using the first SIM card.

15. A non-transitory machine-readable medium having tangibly stored thereon executable instructions for execution by a processor of a mobile transceiver, the mobile transceiver comprising a cellular transceiver and a plurality of subscriber identity module (SIM) cards coupled to the processor, wherein the executable instructions, when executed by the processor, cause the mobile transceiver, to:
search, via the cellular transceiver, for available wireless services associated with a first SIM card of the plurality of SIM cards; and
in response to a determination that a wireless service for the first SIM card is not available, switch from the first SIM card to a second SIM card of the plurality of SIM cards.

16. The non-transitory machine-readable medium of claim 15, wherein the executable instructions further cause the mobile transceiver to:
activate a cellular transceiver from a low power mode in response to a wakeup event, wherein the cellular transceiver is activated using the first SIM card;
when a wireless service is available, determine whether the second SIM card or a different SIM card of the plurality of SIM cards is preferred to the first SIM card; and
switch from the first SIM card to the second SIM card or different SIM card when the second SIM card or the different SIM card is preferred to the first SIM card.

17. The non-transitory machine-readable medium of claim 15, wherein the executable instructions further cause the mobile transceiver to:
wake up the cellular transceiver from a low power mode;
select the first SIM card from the plurality of SIM cards;
activate the cellular transceiver using the first SIM card; and
switch from the first SIM card to the second SIM card in the plurality of SIM cards when a wireless service for the first SIM card is not available.

18. The non-transitory machine-readable medium of claim 16, wherein the executable instructions further cause the mobile transceiver to:
when the second SIM card or different SIM card is not available or does not respond or is not specified, automatically switch to an alternate SIM card that is either the first SIM card or another different SIM card in the plurality of SIM cards.

19. The non-transitory machine-readable medium of claim 15, wherein the executable instructions further cause the mobile transceiver to:
reset the cellular transceiver using the second SIM card; and
search, via the cellular transceiver, for available wireless services associated with the second SIM card.

20. The non-transitory machine-readable medium of claim 15, wherein the executable instructions further cause the mobile transceiver to:
activate the cellular transceiver from a low power mode in response to a wakeup event, wherein the cellular transceiver is activated using the first SIM card.

* * * * *